United States Patent [19]

D'Andrea et al.

[11] Patent Number: 5,012,710
[45] Date of Patent: May 7, 1991

[54] DEVICE FOR THE AUTOMATIC ENGAGEMENT OF THE FEED MOVEMENT AND OF THE RETURN MOVEMENT OF THE TOOL SLIDE OF A BORING HEAD

[75] Inventors: Nicola D'Andrea; Ermanno D'Andrea, both of Lainate, Italy

[73] Assignee: D'Andrea S.p.A., Italy

[21] Appl. No.: 420,056

[22] Filed: Oct. 11, 1989

[30] Foreign Application Priority Data

Oct. 14, 1988 [IT] Italy ................ 22323 A/88

[51] Int. Cl.$^5$ ............................ B23B 29/034
[52] U.S. Cl. ........................... 82/1.2; 82/123; 82/131; 408/181
[58] Field of Search ............ 82/1.2, 1.3, 1.5, 1.4, 82/128, 113, 123, 130, 131; 408/181; 29/568

[56] References Cited

U.S. PATENT DOCUMENTS

| | | | |
|---|---|---|---|
| 4,480,700 | 11/1984 | Kieger | 82/131 |
| 4,489,629 | 12/1984 | D'Andrea | 29/568 |
| 4,607,549 | 8/1986 | Krempel | 82/131 |
| 4,637,285 | 1/1987 | Mizoguchi | 82/131 |
| 4,762,037 | 8/1988 | Stoffel | 82/123 |

Primary Examiner—Frederick R. Schmidt
Assistant Examiner—Blynn Shideler
Attorney, Agent, or Firm—Kirschstein, Ottinger, Israel & Schiffmiller

[57] ABSTRACT

Device for the automatic engagement of the feed movement and of the return movement of the tool slide of a boring head, in which a gear rim is arranged on the inside of the head housing, which gear rim is provided with radially projecting pins, on which camlike thickenings of a ring are mounted, which interacts with vertically arranged cylindrical pins, which are acted upon via spring means, the cylindrical pins being arranged in a position which is pressed downwards in such a manner that they act upon a control disc, which is in work connection with a control cylinder which has a peg, which interacts with a displaceable sleeve and serves to bring a toothed wheel with spur gearing or a second toothed wheel with spur gearing into work connection with a first gear arrangement or with a second gear arrangement respectively and that furthermore means are provided, which form part of a gear arrangement, in order to carry out the feed movement or the return movement of the tool slide.

3 Claims, 4 Drawing Sheets

DEVICE FOR THE AUTOMATIC ENGAGEMENT OF THE FEED MOVEMENT AND OF THE RETURN MOVEMENT OF THE TOOL SLIDE OF A BORING HEAD

BACKGROUND OF THE INVENTION

1. Field of the Invention

The present invention relates to a device for the automatic engagement of the feed movement and of the return movement of the slide of a boring head.

2. Description of Related Art

In machine tools, boring heads and facing heads are used, which consist essentially of a displaceable tool slide which accommodates the tool for the chip removal.

The description of a boring head or a facing head for a known boring head of the U-MATIC construction type, which is manufactured by the assignee, can be obtained from the "Operating instructions" from 1988 which relate to boring heads of the types U70, U95 and U125. In this exemplary embodiment, only a feed movement can be carried out by the tool accommodating slide. After the end stop for limiting the feed movement of the tool has been reached, the return movement of the slide must be initiated by the use of a key. In this connection the key is inserted into a recess of an operating device of the boring head in order to bring about, by means of a rotary movement of the device, the return movement of the tool slide. For this reversal process, interruption of the rotary movement of the boring and facing head is unavoidable.

It is obvious that the known boring head cannot be used in modern machining centres, as with these machine tools there is no possibility of engaging by manual operation a return movement of the slide.

From a WOHLHAUPTER brochure, "Machining applications using the APD automatic facing head", publication number 120382, a further boring and facing head has become known. In this known head it is possible to automatically trigger a feed movement and a return movement of the radial slide. The known head has a projecting arm which is provided with a connection coupling which must be brought into work connection with a special connection point provided to this end on the machine tool. By these means the transfer of an air impulse becomes possible, in order to bring about the necessary control processes for the reversal of the direction of movement of the tool slide of the boring head.

The disadvantage of this known boring head is that, in addition to a connection point in the body of the machine tool, which connection point must be connected to a compressed air source, precise control of the compressed air impulse must also be carried out, in order to thus initiate the reversal of the direction of movement of the tool slide at a desired point.

From U.S. Pat. No. 4,637,285 a further boring and facing head has become known, which has an automatic device for the control of the feed movement and of the return movement of the slide. This head not only has an extraordinarily expensive mechanical construction, but there are also operating means, for the control of the movement of the tool slide, provided on the outside of the head. Furthermore, it is not possible with this known device to carry out a boring process with continuous feed movement. In the described exemplary embodiment according to U.S. Pat. No. 4,637,285, the feed of the tool is carried out in steps, and so the tool is, for example, indexed to the next position after four revolutions.

SUMMARY OF THE PRESENT INVENTION

The object of the present invention is to avoid the disadvantages of the prior art and to propose a new device which makes it possible, in a boring head with continuous uniform feed movement of the tool, to automatically engage both the feed movement and the return movement of the tool slide.

According to the invention, this object is achieved in that, in a boring head with a gear rim known per se on the inside of the body of the head, it is provided that the gear rim has radially projecting pins, on which cam-like thickenings of a ring rest, the ring interacting with vertically arranged cylindrical pins, which are acted upon by spring means, and the cylindrical pins in lowered position act upon a control disc, which is in work connection with a control cylinder which has a projecting peg, which is in work connection with a displaceable sleeve which serves to bring a toothed wheel with spur gearing or a further toothed wheel with spur gearing into work connection with a first toothed gearing or with a second toothed gearing respectively, these toothed gearings being part of a gear which is provided for the feed movement or the return movement of the radially movable tool slide.

With a boring head of this type it becomes possible to change in an automatic manner the feed movement into a return movement, without it being necessary in this connection to use means which are not part of the boring head. Further advantages of the invention are given in the following description. The subject of the invention is now described in greater detail with reference to an exemplary embodiment and represented in the drawings, in which

DETAILED DESCRIPTION OF THE PREFERRED EMBODIMENTS

Figure 1:
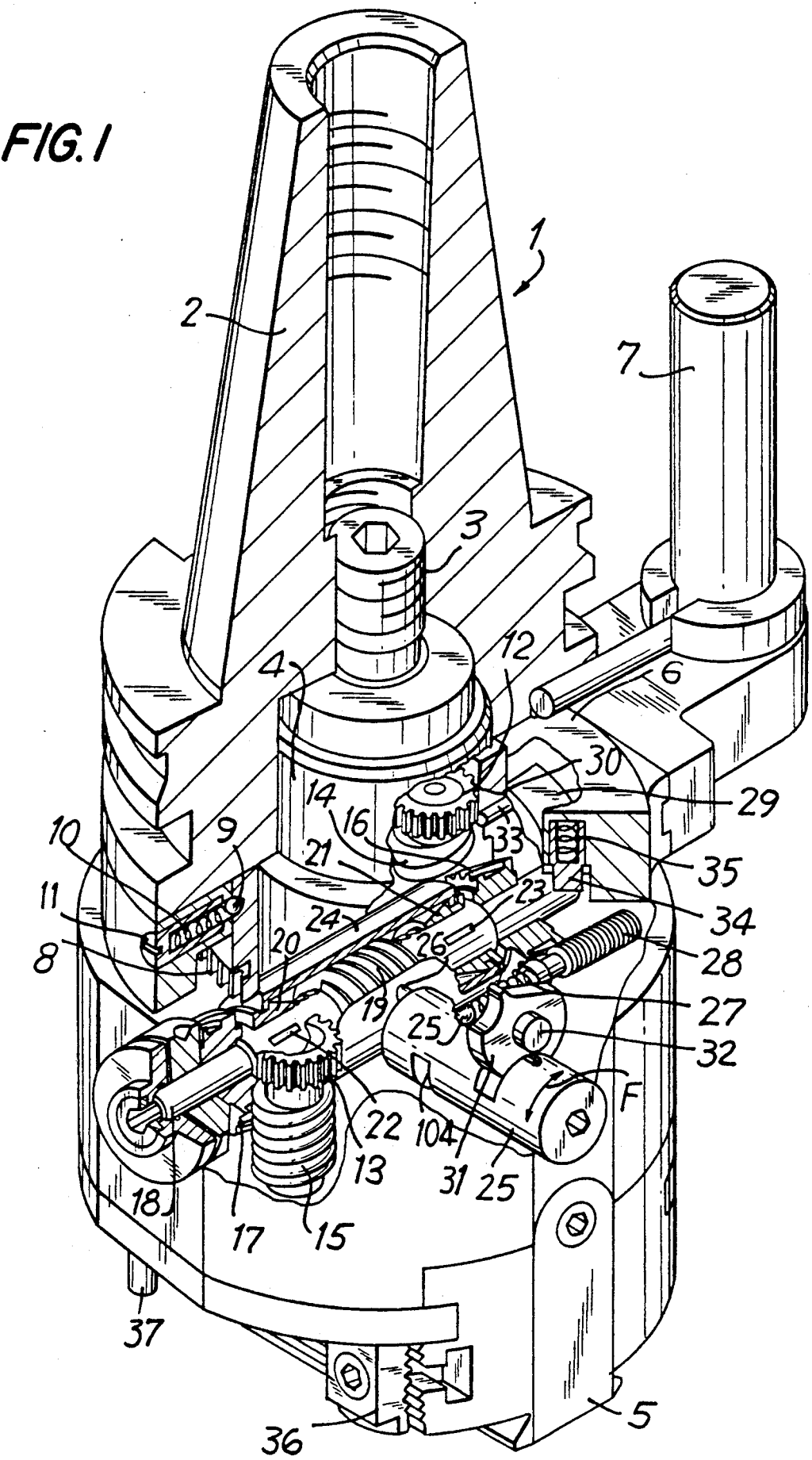
FIG. 1 shows the drilling and boring head according to the invention in a perspective view and partially in section.
Figure 2:
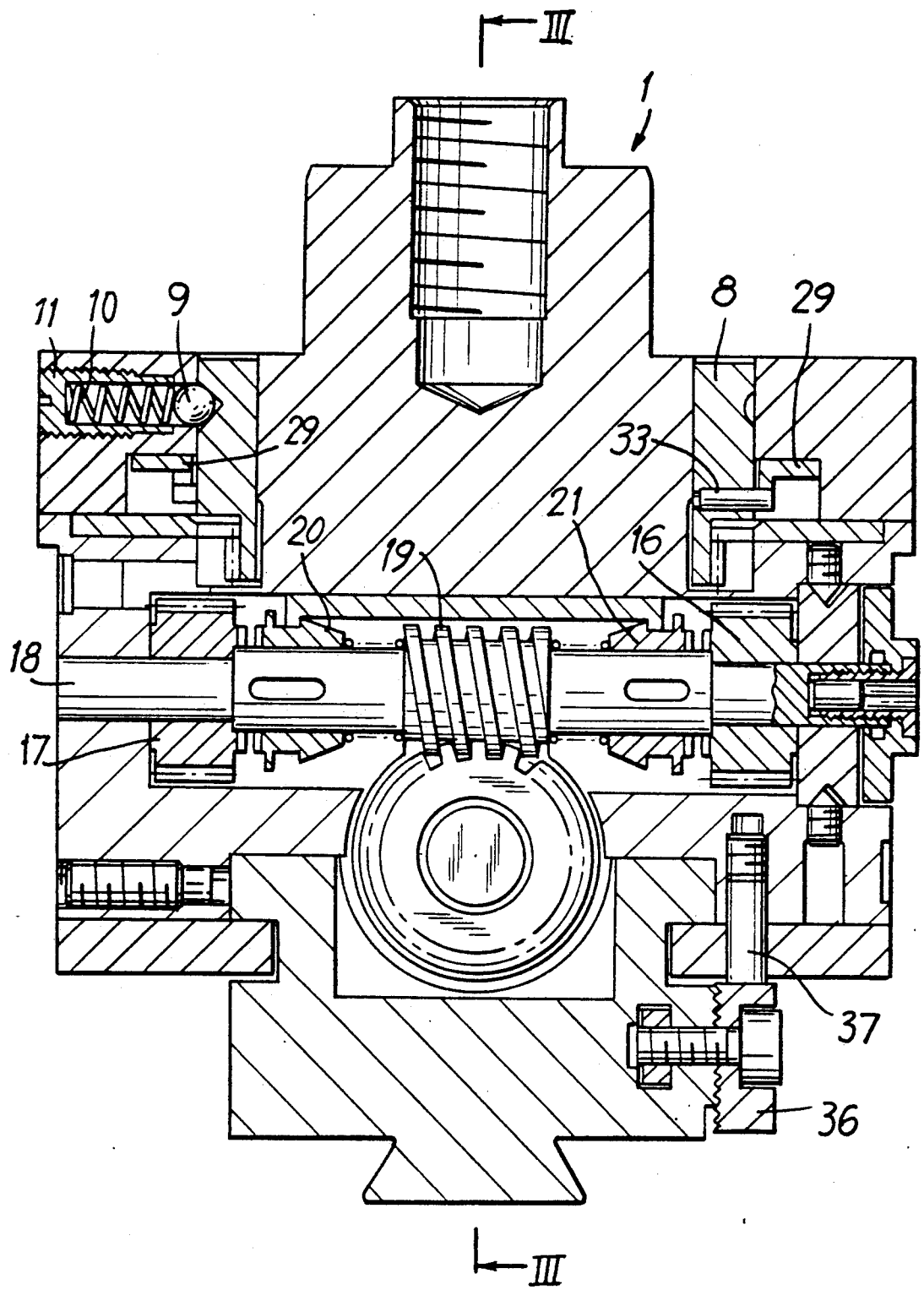
FIG. 2 shows the head according to the invention in section.
Figure 3:
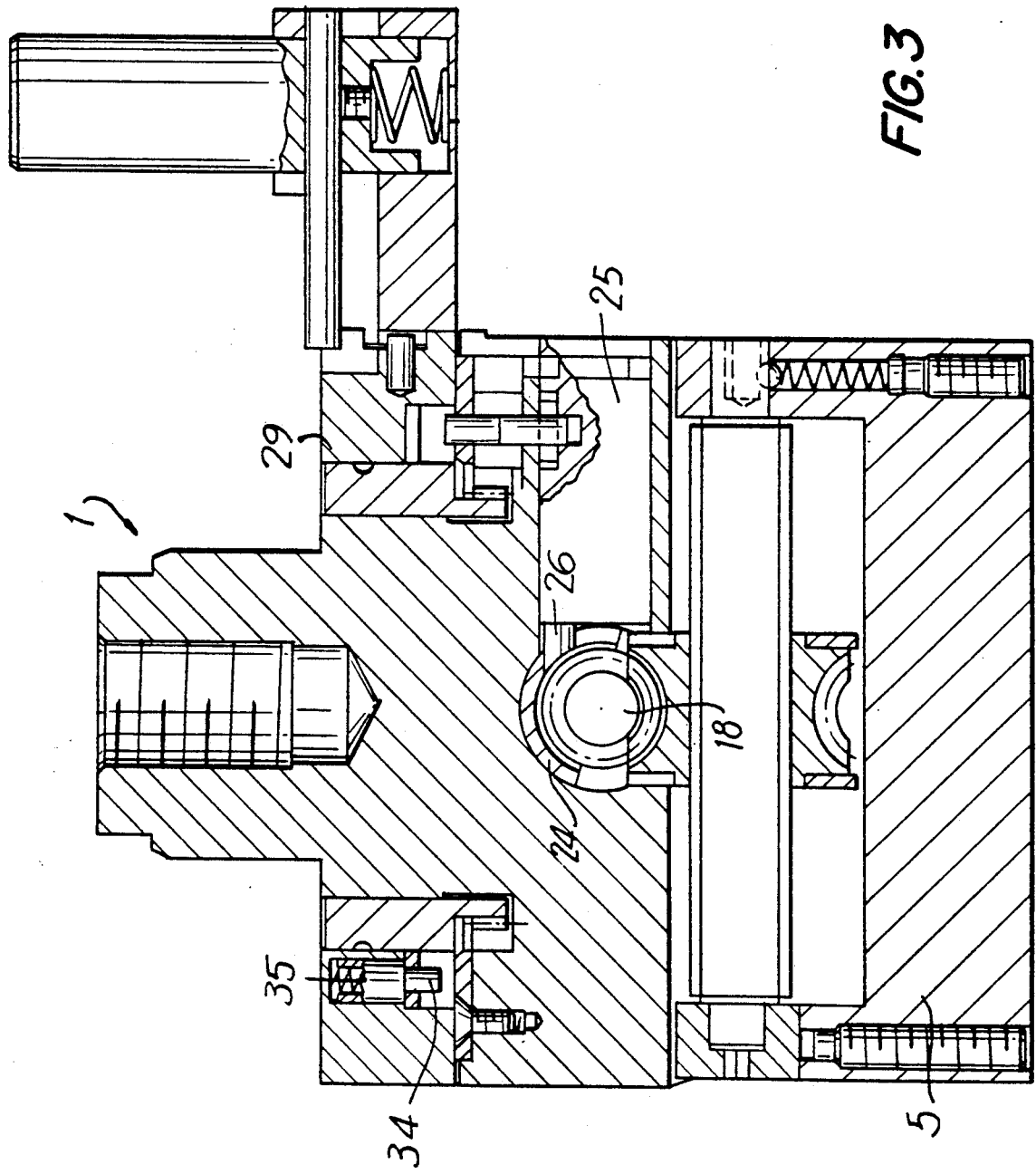
FIG. 3 shows a section of the boring head along the line III—III in FIG. 2.

The boring and facing head is indicated in its entirety by 1 and has a clamping cone 2 which is connected by means of a clamping bolt 3 to the tool body 4. In the tool body 4, a tool accommodating slide 5 is guided displaceably in a known manner.

A flange 6 is prevented by a peg 7, which causes a counter-torque, from carrying out a rotary movement. A gear rim 8 is, via balls 9 which are prestressed by springs 10, in work connection with the flange 6. The springs 10 are advantageously prestressed via headless screws 11. The dimensions and the mutual arrangement of the gear rim 8 and the flange 6 are chosen in such a manner that, in normal operating position, the balls engage in recesses which are made in the body of the gear rim 8. In this manner, with the aid of the springs 10 and the balls 9, a positioning device or a device which forms an end stop is produced between the gear rim 8 and the flange 6. At the same time, a safety device is produced which can be adjusted via the prestressing of the springs 10 and, in the event of widths which are too large occurring, leads to the balls 9 overcoming the resistance formed by the springs 10 and coming out of the recesses and rolling down the side face of the gear rim 8. The rotary movement of the gear rim 8 is carried out with the same speed as the body 4, by means of which no rotary movement of the toothed gearings provided, which are in work connection with the body 4, is caused. This principle is known from prior art.

In a manner known per se the gear rim 8 is in work connection with two toothed gearings.

More exactly, a first toothed gearing 12 and a second toothed gearing 13 are in work connection with the gear rim 8. The toothed gearings 12 and 13 are in rigid work connection with a threaded worm 14 or 15. The threaded worms 14 and 15 engage respectively with a toothed wheel 16 or 17. The toothed wheels have a spur gearing and are arranged freely rotatably on the shaft 18 of the threaded worm 19.

Both the toothed gearings 12, 14 and the toothed gearings 13, 15 are mounted freely rotatably. The worm 15 is in work connection with the toothed wheel 17 which is mounted freely rotatably on the shaft of the threaded worm 19. Furthermore, the worm 14 is in work connection with the toothed wheel 16 which is also mounted on the shaft 18. On the shaft 18, which supports the threaded worm 19, two sleeves 20 and 21 are arranged which, although they can carry out an axial movement on the shaft 18, are nevertheless connected in a rotationally fixed manner to the shaft as a result of their rigid connection via feather keys 22, 23.

The sleeves 20, 21 have a circumferential groove to which the tooth-like projections of a sliding sleeve 24 are connected. The sliding sleeve 24 is formed as a half-shell shaped component. The displacement of the sleeve 24 in the axial direction in both directions of movement is brought about via an angular adjustment of a control cylinder 25 by means of rotation about its own axis. The axis of the positioning cylinder 25 is arranged perpendicular to the axis of the shaft 18.

The positioning cylinder 25 has an eccentric extension 26 which is in work connection with a recess in the displaceable sleeve 24. Thus, by means of rotary movement of the positioning cylinder 25 in the direction of the arrow (f), a displacement of the sleeve 24 in one or the other direction can be achieved.

The displacement of the sleeve 24, to the right for example, causes the displacement of the sleeve-shaped component 21, as a result of which the spur gearing of this component enters into work connection with the toothed wheel 16 which has a similar spur gearing.

A displacement of the sleeve 24 to the left causes a similar displacement of the sleeve-like component 20, as a result of which a work connection of the spur gearing of this component with the toothed wheel 17 arises.

According to the direction of displacement of the component 24, a kinematic work connection between the threaded worm 19 and the worm 14 or the worm 15 is thus achieved, which are in work connection with the toothed gearing 12 or the toothed gearing 13. It is thus possible to initiate a feed movement of the slide 5 for the chip-removing machining of the workpiece by means of a tool (not shown) or it is possible to initiate a return movement for the tool slide 5. The control cylinder is assigned a locking device 25' which consists of a ball 25' which is prestressed by a spring 27. The spring 27 is adjustable via a screw 28. It is thus possible to adjust the prestressing force with which the ball 25' is pressed into a recess in the control cylinder 25.

By means of a positive connection, the projecting part of a control disc 31 is connected to the control cylinder 25 and the control disc 31 is mounted on the inside of the head 1 via a shaft 32. The head 1 and the constituent components, as have so far been described, correspond essentially to the construction of the known boring heads U70, U95 and U128 as the latter are contained, according to the introduction of the description, in company documents of the assignee.

Above the gear part, which surrounds the gear rim 8, the boring head 1 accommodates an annular disc 29 which on its underside has cam-like projections 30. These are distributed uniformly over the circumference of the disc 29. The cams which project from the disc 29 are held in a raised position via pins 33. The pins 33 are in work connection with the gear rim 8 and project radially from the latter. Furthermore, the ring 29 has vertically projecting pins 34 which are acted upon by springs 35. When the cams 30 rest on the pins 33, the cylindrical pins 34 are in rest position.

The method of operation of the device according to the invention is as described below.

At the beginning of the chip-removing machining, the control cylinder 25 is rotated, via a hexagon spanner for example, in the clockwise direction, by means of which the feed movement of the tool slide 5 is engaged.

At the same time, the stops 36 are fixed in a conventional manner in their position, in order to determine the working stroke of the tool slide.

As soon as the boring head 1 is set in rotary movement, the tool slide 5 is displaced by means of the components so far described to carry out the working stroke.

The tool slide 5 can thus be moved until the stop 36 makes contact with the peg 37, which is arranged in a fixed manner on the tool body 1. Thus the feed movement of the tool slide 5 is interrupted and the gear of the head 1 transmits a torque to the gear rim 8. As a result, the gear rim 8 overcomes the resistance exerted by the balls 9 and carries out a rotary movement. The rotary movement leads to the pins 33, on which the cams 30 of the ring 29 rest, being displaced also, as these are rigidly connected to the body of the gear rim 8. The ring 29 is thus released and, as a result of the action of the springs 35 which act upon the cylindrical components 34, the ring 29 is moved downwards together with the cylindrical components 34. As a result of this, one of the cylindrical components 34 acts upon the control disc 31 which forces the latter to carry out a swivelling movement.

The swivelling movement of the control disc 31 causes a rotary movement of the control cylinder 25 in the anticlockwise direction via the eccentrically projecting peg 26, as a result of which there is a displacement of the sliding sleeve 24 to the left and an interruption of the feed movement is brought about at the same time as the rapid automatic return movement starts. Simultaneously the balls 9 go back into the recesses in the gear rim 8, as a result of which the supporting pins 33 again carry out a raising of the ring 29 with the associated cylindrical components 34. The gear rim 8 is held on the flange 6 by the action of the balls 9 and the gear carries out the return of the slide 5 into its original position.

The return movement of the slide 5 is then interrupted when a corresponding stop 36 makes contact with the peg 37. At this moment, the rotary movement of the gear arrangement is also interrupted, there is again a rotation of the gear rim 8 and thus the supporting pins 33 are again displaced as they are in work connection with the body of the gear rim 8. A release of the ring 29 takes place, which under the action of the springs 35, which interact with the cylindrical components 34, is moved downwards together with the cylinders 34. Subsequently a stopping of the machine spindle is carried out via the NC arrangement of the machine.

Subsequently, via the NC arrangement, a rotary movement for two or three revolutions in the anticlockwise direction is carried out by the machine spindle, as a result of which a preparation of the head 1 to carry out further work cycles is again carried out via the clamping cone 2 of the boring head 1. Then the spindle is stopped again.

During the rotary movement in the anticlockwise direction, one of the cylindrical components 34 makes contact with the control disc 31, as a result of which a swivelling movement of the disc 31 is again brought about. This swivelling movement of the disc 31 swivels in the anticlockwise direction the peg 26 which in turn displaces the sliding sleeve 24 to the right and thus engages the feed movement again. In this connection, the balls go back into the recesses in the gear rim 8 and, by means of the pins 33, a raising of the ring 29 with the associated cylindrical components 34 is again carried out.

A further rotary movement of the machine spindle to carry out the chip-removing machining via the tool slide 5 leads to the feed movement being engaged again.

Figure 4:
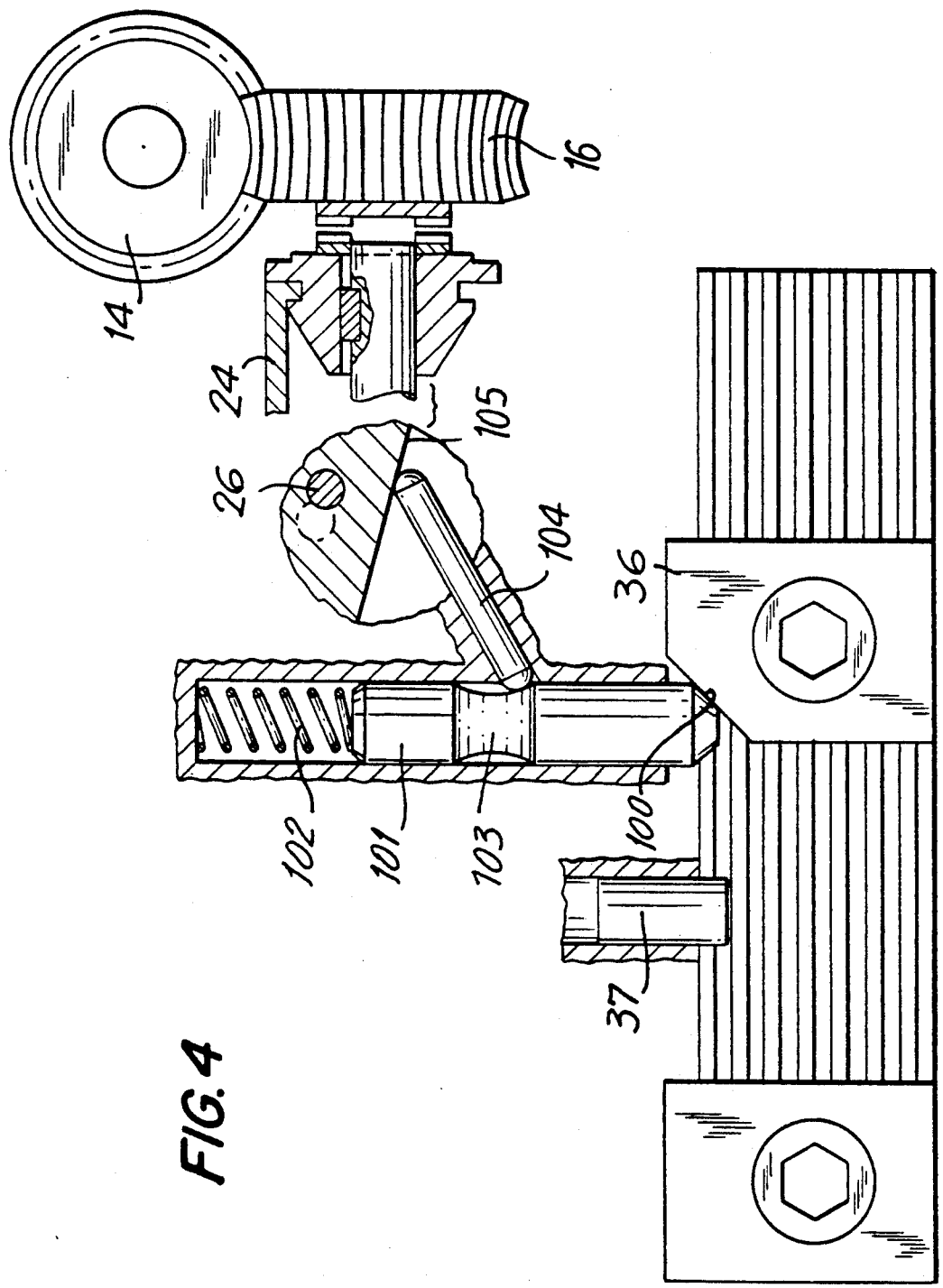
FIG. 4 shows a detail of an additional exemplary embodiment of the reversing device.

An advantageous embodiment for the reliable reversing of the feed movement into a return movement can be seen in the device according to FIG. 4.

Advantageously an adjustable stop 36 is provided. This stop 36 has an inclined plane surface 100 which interacts with a pin 101 which, in addition to the stop pin 37, is arranged in the body of the boring head 1. The pin 101 is prestressed by a spring 102 and has a circumferential groove 103 which is in work connection with an operating pin 104. The operating pin 104 is also arranged in the body of the boring head 1 and acts upon an additional plane surface 105 of the control cylinder 25. The latter acts upon the control sleeve 24 via a peg 26.

This device simplifies the reversing from the feed movement to the return movement in the manner described below.

Before the pin 37 makes contact with the stop 36, the pin 101 already runs gradually up the inclined plane surface 100, against the action of the spring 102. The pin 101 is raised slowly and at the same time pushes the pin 104 towards the surface 105 of the control cylinder 25. As a result of this, the cylinder 25 and thus the control sleeve 24 are brought into a neutral position or waiting position. The control sleeve 24 is then displaced from this waiting position when the peg 37, which is arranged in a fixed manner, reaches the stopping device 36 and as a result causes the cylindrical component 25, in order to reverse, to be finally swivelled into that position in which the reversing process is completely carried out.

We claim:

1. In a machine tool of the type having a facing and boring head extending along a longitudinal axis, and a tool holder mounted on the head for reciprocating movement along feed and return directions along a transverse axis perpendicular to the longitudinal axis, an arrangement for automatically controlling the movement of the tool holder along the feed and return directions, comprising:
   (a) an annular rim gear rotatable about the longitudinal axis and having transversely-extending pins on the rim gear for joint rotary movement therewith;
   (b) an annular member having a plurality of cam portions arranged about the longitudinal axis and engageable with the pins between raised and lowered positions along the longitudinal axis during the rotary movement of the rim gear, said annular member also having longitudinally-extending spring-biased projections;
   (c) an actuator disc mounted for turning movement between actuating positions, and having a cam follower surface engaged by the projections for turning the actuator between said actuating positions during the rotary movement of the rim gear;
   (d) a control cylinder having a control peg mounted for movement between end positions in response to movement of the actuator disc between the actuating positions;
   (e) a transversely-extending sleeve mounted on the head for reciprocating movement along the transverse axis;
   (f) a first gear transmission coupled between the rim gear and the tool holder for moving the tool holder along the feed direction;
   (g) a second gear transmission coupled between the rim gear and the tool holder for moving the tool holder along the return direction;
   (h) a transversely-extending worm shaft having opposite end regions; and
   (i) a pair of spur gears mounted at the opposite end regions of the worm shaft, each spur gear being mounted at opposite ends of the sleeve for joint movement therewith along the transverse axis, one of the spur gears being moved into engagement with the first gear transmission in response to movement of the control peg to one end position to initiate movement of the tool holder along the feed direction, and the other of the spur gears being moved into engagement with the second gear transmission in response to movement of the control peg to the other end position to initiate movement of the tool holder along the return direction.

2. The arrangement according to claim 1, wherein the control cylinder has a control surface engaged with one end of an elongated operating pin having an opposite end engaged with a spring-biased movable control pin; and wherein a stop and a stop pin are adjustably mounted on the head for limiting movement of the holder along the feed and return directions, said stop having an actuating surface engageable by the control pin to move the control pin and the operating pin for moving the control peg of the control cylinder between said end positions before the stop pin engages the stop.

3. The arrangement according to claim 2, wherein the control surface and the actuating surface are inclined, planar surfaces.

* * * * *